W. A. JONES.
Carriage-Brake.
No. 59,610. Patented Nov. 13, 1866.
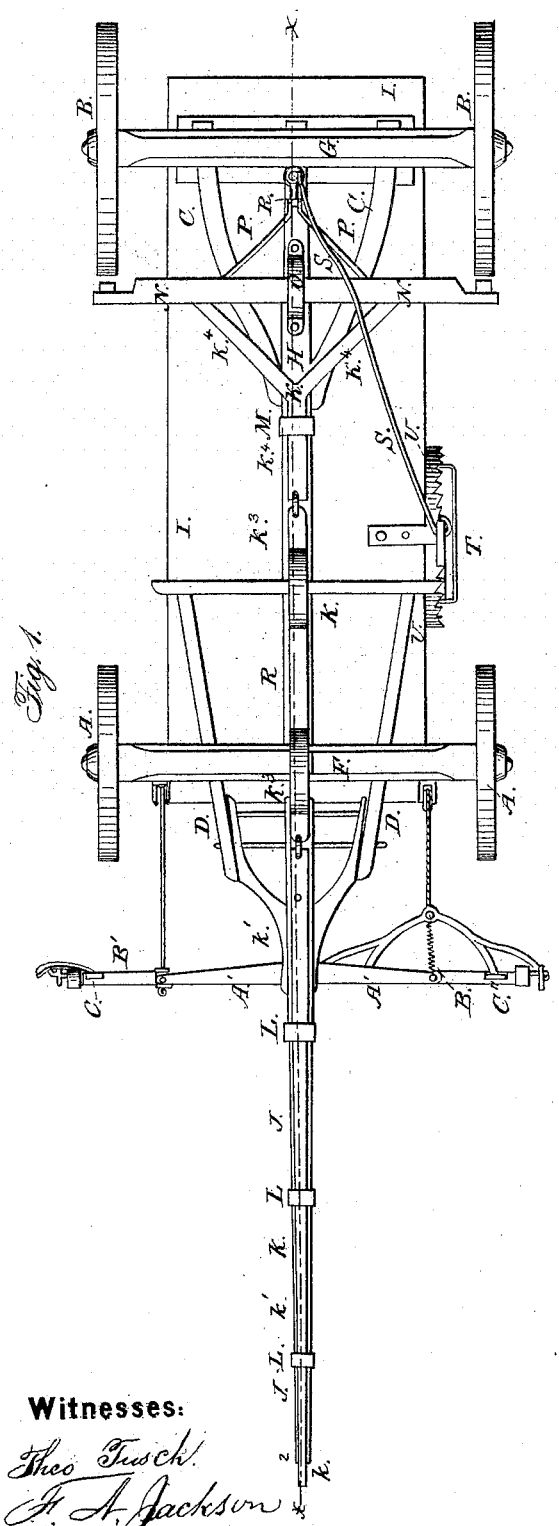
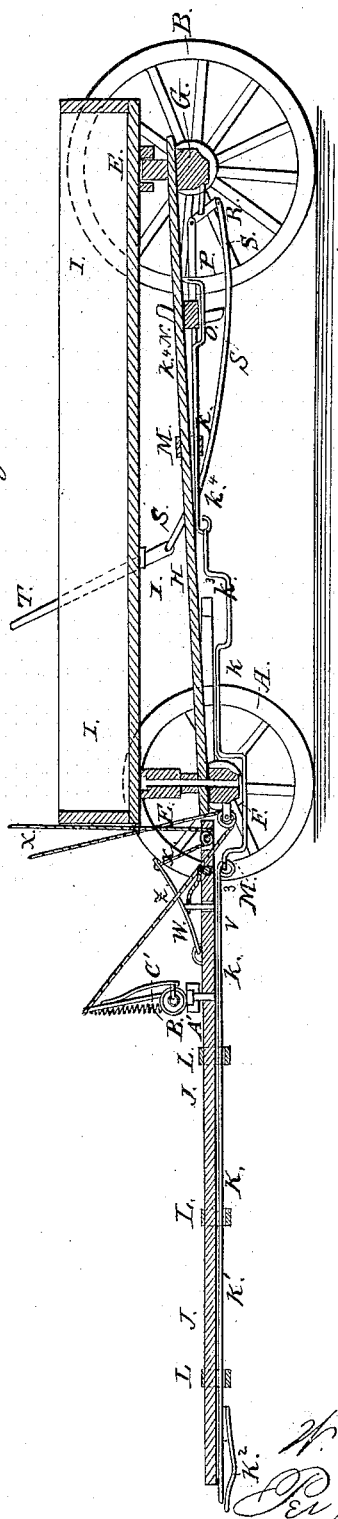
Witnesses:
Theo Tusch
F. A. Jackson
Inventor:
W. A. Jones
Per Munn & Co.
Attorneys.

UNITED STATES PATENT OFFICE.

WILLIAM ASHLEY JONES, OF DUBUQUE, IOWA.

IMPROVEMENT IN VEHICLES.

Specification forming part of Letters Patent No. 59,610, dated November 13, 1866.

*To all whom it may concern:*

Be it known that I, WILLIAM ASHLEY JONES, of Dubuque, in the county of Dubuque and State of Iowa, have invented new and useful Improvements in Vehicles; and I do hereby declare that the following is a full, clear, and exact description thereof, which will enable others skilled in the art to make and use the same, reference being had to the accompanying drawings, forming part of this specification, in which—

Figure 1 is a view of the under side of a wagon with my improvements attached. Fig. 2 is a vertical longitudinal section of the same, taken through the line $x\,x$, Fig. 1.

Similar letters of reference indicate like parts.

My invention has for its object to furnish an improved means by which the brake may be applied to the wheels with exactly the necessary amount of force, by which the wheels may be locked upon an up or a down grade, and by which the horses may be disengaged from the wagon whenever necessary; and it consists, first, in the combination of a jointed rod or bar with the tongue, reach, and brake-bar of the wagon, buggy, or other vehicle; second, in the combination of a bolt, spring, lever, cord or strap, and pulley with each other, with the tongue, and with the jointed bar; third, in the combination of levers, connecting-rods, and rack with each other and with the wagon-box, rear axle, and brake-bar; and, fourth, in the combination of bent bars, hooked rods, springs, cords, and pulleys with each other and with the whiffletrees of the wagon, the whole being constructed and arranged as hereinafter more fully described.

A are the fore wheels, B the hind wheels, C the rear hounds, D the front hounds, E the bolsters, F the fore axle, G the rear axle, H the reach, and I the box, of the wagon, about the construction and arrangement of which parts there is nothing new. J is the tongue, which is pivoted to the forward hounds, D, in the usual manner. K is the jointed bar, the forward part, $k^1$, of which passes along the under side of the tongue J, with which it is connected by bands L or staples, which keep it in place, but allow it to play back and forth as required. To the forward ends of the jointed bar K is attached a spring, $k^2$, of sufficient stiffness to keep the neck-yoke ring in place under ordinary circumstances, but which will allow the said ring to slip off when the horses are released from the whiffletrees.

The part $k^3$ of the bar K is jointed to the part $k^1$ at the rear end of the tongue J, to allow the tongue to have the necessary up-and-down play, and also to allow the wagon to be cramped in turning.

The piece $k^3$ is made with one or more square notches or crooks, when necessary, to enable it to pass around the lower side of the forward axle, F, or other timbers, and it is connected to the rear part, $k^4$, of the rod $k$ at about the middle part of the reach H, as shown in Figs. 1 and 2. The part $k^4$ is connected to the reach H by a band, M, or a staple, which allows it to move freely back and forth. A little in the rear of the band, M, the part $k^4$ of the bar K divides into two branches, the ends of which are connected to the brake-bar N, to insure both ends of the said bar moving equally. The brake-bar N is connected to the reach H, and held in place by the band O or a staple, which allows it to have sufficient play backward and forward, as shown in Figs. 1 and 2.

To the rear side of the brake-bar N are attached two inclined connecting-rods, P, to the rear ends of which are pivoted the upper end of the lever R. This lever R is pivoted to the rear axle, G, and to its lower end is pivoted the end of the connecting-rod S, the other end of which is pivoted to the lower end of the lever T. The lever T is pivoted to the side of the wagon-box I, or rack, and its free end extends up so that it can be reached and operated by the driver when desired.

The lever T is held in any position in which it may be placed by catching upon the teeth of the rack U, attached to the side of the wagon-box I, or wood, hay, or lumber rack, as shown in Fig. 1.

V is a pin or bolt passing down through a hole in the rear part of the tongue J, and through a hole in the rear part of the part $k^1$ of the jointed bar K when the said bar is in the proper position. The upper end of the pin or bolt V is attached to the lever W, to the free end of which is attached a cord or strap, X, passing around a pulley, Y, pivoted to the rear end of the tongue, and passing thence up to the wagon-box, hay-rack, &c., where it is secured in such a position that it can be readily reached and operated by the driver.

By pulling upon the strap or cord X the driver can force the pin or bolt V down through the hole in the jointed bar K and prevent the brake from being operated by the horses.

When the strain upon the cord or strap X is released the lever W is forced up, lifting the pin or bolt V away from the jointed bar K by the action of the spring Z, one end of which is attached to the tongue J, and the other presses against the under side of the lever W, as shown in Fig. 2.

A' is the double-tree, which is made and attached to the tongue J in the ordinary manner. B' are whiffletrees, which are pivoted to the ends of the double-tree A' in the ordinary manner.

In a longitudinal groove running along the rear part of the whiffletrees B' are pivoted rods C', having hooks formed upon their ends, said hooks projecting far enough beyond the ends of the said whiffletrees to allow the tug-eyes to be hooked upon them. To the rods C', near their ends, are securely attached the ends of the bent bars D', which, when the whiffletrees B' and rods C' are in their ordinary positions, project above the said whiffletrees.

To the bent bars D' are attached light springs E', the ends of which rest upon the ends of the hooks formed upon the ends of the rods C'. These springs E' keep the tug-eyes in their places upon the hooks when the rods C' are in their ordinary position; but when the rods C' are revolved they allow the tug-eyes to be drawn from the hooks, freeing the horses from the wagon.

F' are springs, one end of which is attached to the middle parts of the whiffletrees B', and their other ends to the middle part of the bent bars D'. The object of these springs is to hold the bent bars D' and rods C' in the proper position to receive the draft-strain.

G' are cords or straps attached to the middle parts of the bent bars D', passing around the pulleys H', attached to the forward axle, F, or to some other suitable support, and are secured to the wagon-box I in such a position that they can be easily reached and operated by the driver.

By pulling upon the cords or straps G' the rods C' are revolved, allowing the tug-eyes to slip from the hooks, and freeing the horses from the wagon.

By this construction and arrangement of parts the brake, when upon a down grade, is applied to the wheels with the same force with which the load presses forward against the horses; and when upon an up or down grade the brake may be applied to the wheels by the lever T, to hold the load and allow the horses to rest.

When it is desired to back the wagon without applying the brake by pulling upon the cord or strap X, the pin V is forced down through the jointed bar K, and the strain then comes upon the said pin instead of being applied to the brakes.

It will be observed that these improvements can readily be applied to any kind of a single or double wagon, carriage, or cart, so as to operate in the same way and for the same purpose.

What I claim as new, and desire to secure by Letters Patent, is—

1. The combination of the jointed rod or bar K with the tongue J, reach H, and brake-bar N, when said bar K is constructed and arranged substantially as herein described, and for the purpose set forth.

2. The combination of the bolt or pin V, spring Z, lever W, cord or strap X, and pulley Y with each other, with the tongue J, and with the jointed bar K, substantially as herein described, and for the purpose set forth.

3. The combination of the lever T, rack U, connecting-rod S, lever R, and connecting-rods P with each other and with the box I, axle G, and brake-bar N, substantially as herein described, and for the purpose set forth.

4. The combination of the bent bars D', hooked rods C', springs F' and E', cords or straps G', and pulleys H' with each other and with the whiffletrees B', substantially as herein described, and for the purpose set forth.

WILLIAM ASHLEY JONES.

Witnesses:
FRANK JENNINGS,
L. H. CADY.